(12) United States Patent
Alam et al.

(10) Patent No.: US 11,296,993 B2
(45) Date of Patent: *Apr. 5, 2022

(54) INFORMATION CENTRIC NETWORK APPROXIMATE COMPUTATION CACHING

(71) Applicant: Intel Corporation, Santa Clara, CA (US)

(72) Inventors: S M Iftekharul Alam, Hillsboro, OR (US); Maria Ramirez Loaiza, Beaverton, OR (US); Stepan Karpenko, Hillsboro, OR (US); Gabriel Arrobo Vidal, Hillsboro, OR (US); Satish Chandra Jha, Hillsboro, OR (US); Yi Zhang, Portland, OR (US); Ned M. Smith, Beaverton, OR (US); Zongrui Ding, Portland, OR (US); Kuilin Clark Chen, Hillsboro, OR (US); Kathiravetpillai Sivanesan, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/456,886

(22) Filed: Jun. 28, 2019

(65) Prior Publication Data

US 2019/0319890 A1 Oct. 17, 2019

(51) Int. Cl.
*H04L 12/801* (2013.01)
*H04L 47/10* (2022.01)
(Continued)

(52) U.S. Cl.
CPC ............ *H04L 47/29* (2013.01); *H04L 45/021* (2013.01); *H04L 45/742* (2013.01)

(58) Field of Classification Search
CPC ..... H04L 45/745; H04L 45/306; H04L 45/54; H04L 47/31; H04L 47/29; H04L 45/021;
(Continued)

(56) References Cited

U.S. PATENT DOCUMENTS

| | | | |
|---|---|---|---|
| 2017/0034055 A1* | 2/2017 | Ravindran | ............ H04L 45/306 |
| 2018/0146058 A1* | 5/2018 | Somayazulu | ............ H04L 67/16 |
| 2019/0349445 A1* | 11/2019 | Somayazulu | ............ H04L 45/14 |

FOREIGN PATENT DOCUMENTS

| | | |
|---|---|---|
| CN | 112148692 A | 12/2020 |
| DE | 102020203647 A1 | 12/2020 |

OTHER PUBLICATIONS

Fuzzy Interest Forwarding by Chan et al. (Year: 2017).*
(Continued)

*Primary Examiner* — Dady Chery
(74) *Attorney, Agent, or Firm* — Schwegman Lundberg & Woessner, P.A.

(57) ABSTRACT

Systems and techniques for information centric network (ICN) approximate computation caching are described herein. For example, an interest packet that includes a feature set of input data may be received. A node may then perform a search of a local data store using the feature set to determine an approximate computation result cached in the local data store. Here, the approximate computation result may be based on input data that differs from the input data named in the interest packet. The node may then return the approximate computation result to an author of the interest packet in response to the search.

24 Claims, 7 Drawing Sheets

(51) Int. Cl.
*H04L 45/021* (2022.01)
*H04L 45/74* (2022.01)

(58) Field of Classification Search
CPC .... H04L 45/742; H04W 40/20; H04W 40/246
See application file for complete search history.

(56) References Cited

OTHER PUBLICATIONS

"German Application Serial No. 102020203647.0, Voluntary Amendment filed May 4, 2020", w/English claims, 9 pgs.

Guo, Peizhen, "Foggycache: Cross-Device Approximate Computation Reuse", Session: Living on the Edge: Mobile Systems at the Network's Edge, (2018), 16 pgs.

Krol, Michal, et al., "NFaaS: named function as a service", In Proceedings of the 4th ACM Conference on Information-Centric Networking. ACM, (Sep. 28, 2017), 134-144.

Krol, Michal, et al., "Rice: Remote method invocation in icn", Network Systems Research & Design, (2018), 39 pgs.

Kuzu, Mehmet, et ai., "Efficient Similarity Search over Encrypted Data", 2012 IEEE 28th International Conference on Data Engineering, (Apr. 2012), 12 pgs.

Qiu, Hang, et al., "AVR: Augmented Vehicular Reality", Association for Computing Machinery., (2018), pp. 81-95.

Tschundin, Christian, et al., "Named functions and cached computations", . In IEEE Consumer Communications and Networking Conference, (2014), 7 pgs.

\* cited by examiner

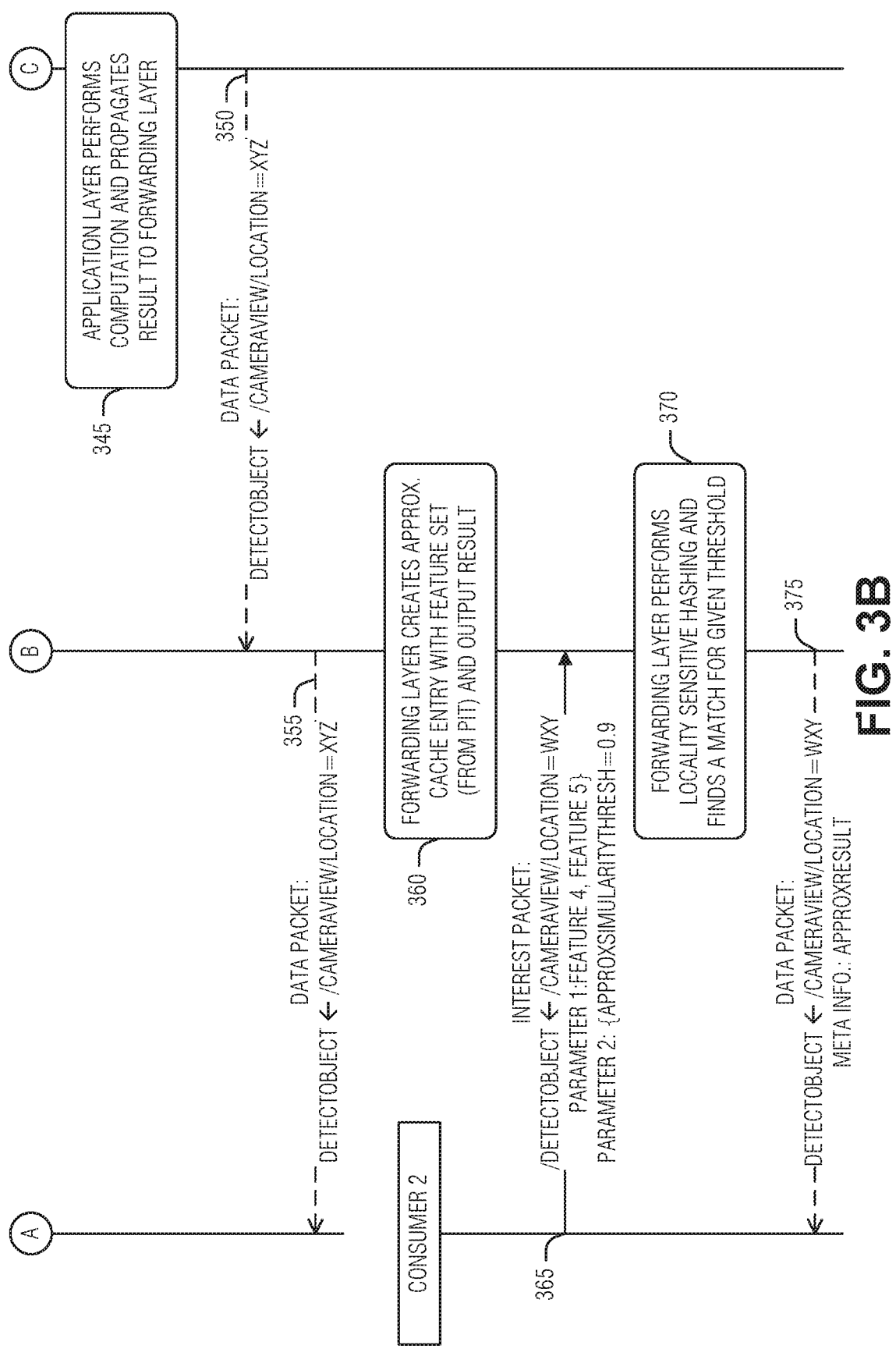

INFORMATION CENTRIC NETWORK APPROXIMATE COMPUTATION CACHING

TECHNICAL FIELD

Embodiments described herein generally relate to computer networking and more specifically to information centric network (ICN) approximate computation caching.

BACKGROUND

ICN is an umbrella term for a new networking paradigm in which information itself is named and requested from the network instead of hosts (e.g., machines that provide information). To get content, a device requests named content from the network itself. The content request may be called an interest and transmitted via an interest packet. As the interest packet traverses network devices (e.g., routers), a record of the interest is kept. When a device that has content matching the name in the interest is encountered, that device may send a data packet in response to the interest packet. Typically, the data packet is tracked back through the network to the source by following the traces of the interest left in the network devices.

The content store (e.g., cache) is an attractive feature of ICN devices in which named data is stored throughout the network to potentially satisfy future requests (e.g., interests). This helps to reduce network traffic and improve end-to-end latency. Named Function Networking (NFN) is an extension to ICN that enables remote function execution. The results of function execution may be cached in the ICN network nodes much like other data. Generally, NFN uses exact matching between input-output relations. Thus, cached computation results are generally used in response to an interest only if the name of the interest packet exactly matches that of cached entry.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 3A-3B illustrates an example of a data flow for ICN approximate computation caching, according to an embodiment.

DETAILED DESCRIPTION

Figure 1:
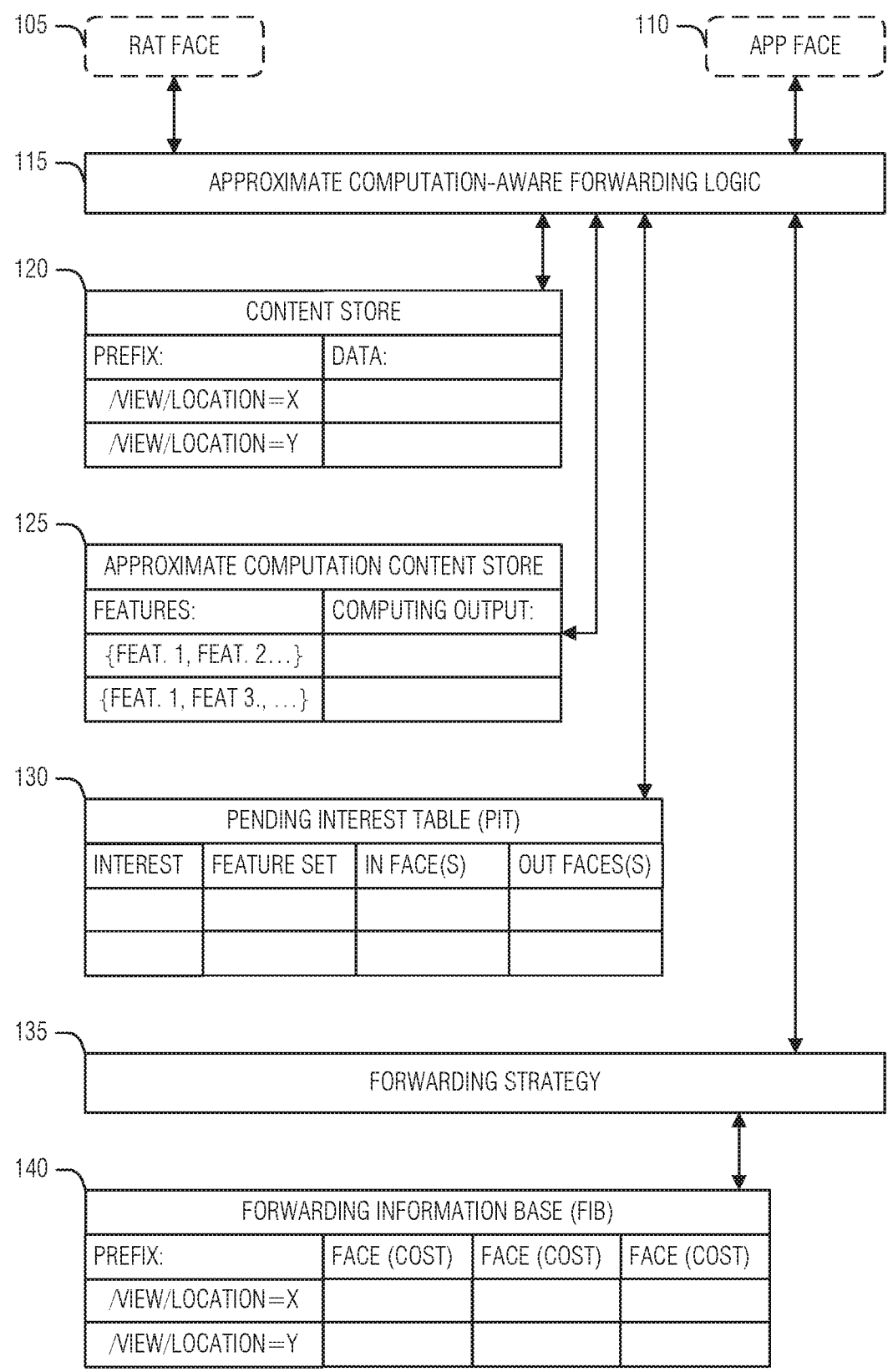
FIG. 1 illustrates an example of ICN components to enable caching of approximate computations, according to an embodiment.

While exact matching between a name in an interest packet and computational results in an NFN generally conforms with ICN semantics, it may reduce the use of cached results that may be useful for the interest when the interest name varies from the name of the results. For example, it has been shown that similarity in input data leads to similar computing results for many popular applications, such as speech recognition, object detection (e.g., from an image of a scene), among others. Input similarity in these cases may result from temporal correlation (e.g., presence of the same object or sound in successive samples) or spatial correlation (e.g., similar scenes observed by nearby devices). In fact, applications, such as these, that use error-tolerant techniques with respect to input data, are candidates for using computational results that are close to what is requested in an interest. Existing ICN and NFN mechanisms do not address this "close enough" flexibility of the proliferating inference-based applications, generally requiring a new computation if the new input data (e.g., as represented by a unique name) does not completely match with a previous one. Thus, these networks miss an opportunity to reuse approximate computation, incurring additional computational overhead or unnecessary traffic on the network in the process.

To address the issues noted above, a cache for approximate computing results may be incorporated into ICN devices. Here, the cache may store previous computation results and provide interest matching based on the similarity of input to a function that produced the results. This cache operates differently than a standard ICN content store because ICN cache that uses exact matching for interest packet name. Thus, an ICN node with an approximate computing results cache may operate via exact matching for ICN requests and approximate matching for NFN requests.

In an example, a locality sensitive hashing over a number of higher dimension feature sets may be used to perform a lookup of approximate computation results. Here, a set of parameters e.g., representing the higher dimension feature set from raw input, similarity score function, or similarity score threshold may be used in interest packets. These interest packets may also include meta data (e.g., meta info, a tag, etc.) indicating that approximate computation results are accepted in response to the interest. Networking forwarding may also be adapted to provide different treatment to interest packets containing the approximate computation tag. Further, the pending interest table (PIT) may be modified to store the set of parameters for approximate matching contained within the interest packet.

In operation, when a computation result is returned from a producer, a new entry may be created in the approximate computation cache. Here, the entry may have a key that is composed of a set of parameters for approximate matching, much like the PIT example described above. The computation results themselves are stored in the entry along with this key. In such a way, the set of parameters for approximate matching in interest packets may be matched with the computational results even when the names between the interest and the result differ. In an example, an ontology tagging for approximate cache matching may be used to retrieve contents that have different names but similar semantic meaning. Here, the comparison between interest and data moves beyond a simple threshold (e.g., within two minutes, within five meters, etc.) to being "close" as defined by the ontology. Thus, for example, "employment data for June through August" may be matched with "Job growth for the summer." Using the ICN approximate computation caching described herein may improve the end-to-end network latency and reduce computational load by reusing NFN results. Additional details and examples are provided below.

FIG. 1 illustrates an example of ICN components to enable caching of approximate computations, according to an embodiment. Here, caching of approximate computations refers to the ability to match computations that approximately the same as those requested via an interest packet, and not necessarily describing the precision of the original computation. Thus, the computation may be approximate as to a successive request.

With the availability of powerful mobile computation devices, such as phones or tablets, and the advancement of autonomous driving technology, contextual recognition is becoming a popular feature of smart applications (e.g., augmented reality, voice assistance, object recognition, etc.). For example, vehicles driving on a road may take an image of the surrounding environment using an image sensor from which the vehicle needs to detect objects, such as other vehicles, road signs, etc. The object detection may be offloaded to a road side unit (RSU). However, due to limited computing capability, the RSU may incur significant latency in responding to requests from multiple vehicles physically close to the vehicle. As noted above, research has demonstrated that images from nearby vehicles taken in a similar time frame (e.g., both temporally and spatially correlated images) are highly correlated. Such spatial or temporal correlation may be exploited to reuse computation results between these vehicles. In an example, for the RSU to determine whether the interests are for correlated results, similarity among inputs images from the various vehicles in this case may be measured by using locality sensitive hashing over high-level feature vectors from the images (e.g., raw data). Example feature vectors that may be used include scale invariant feature transform (SIFT) or speeded up robust features (SURF) for images, perceptual linear prediction (PLY), linear predictive codes (PLC), or Mel Frequency Cepstral Coefficients (MFCC) for audio features, etc.

As illustrated, the components for the RSU mentioned above includes a radio access technology (RAT) interface 105 to communicate with the vehicles, and an application interface 110 to interface with an object recognition application, for example. The RSU also includes a content store 120, a PIT 130, a forwarding interest base (FIB) 140. These components are similar to those described with respect to FIG. 5. The RSU also includes an approximate content store 125 in addition to standard ICN content store. The approximate computation content store 125 uses feature vectors of raw input as a key and processed data (e.g., computation results) as the value. In an example, the approximate computation content store 125 operates similarly to the Foggy-Cache data structure.

To request an approximate computation result, a special interest packet that includes this feature set may be used. An example of such a special interest packet is described with respect to FIG. 2. The feature set is used by the approximate computation-aware forwarding logic 1115 to lookup a result from the approximate computation content store 125. In an example, this lookup may be performed with a locality sensitive hashing technique. Thus, the RSU may deliver approximate content to a requester from the approximate computation content store 125.

If the RSU cannot satisfy the interest, the RSU will forward the interest using a forwarding strategy component 135 informed by the FIB 140. While propagating such interest packets, the approximate computation-aware forwarding logic 115 is configured to create special PIT entries in eth PIT 130 to store the feature set from the interest packet until a corresponding computation result is returned to the RSU. Such a result may come from the application interface 110, or from another node.

In an example, the approximate computation-aware forwarding logic 115 is configured to update the approximate computation content store 125 with a tuple: <the stored feature set (e.g., from the PIT 130), returned computation result>. This enables storage of the feature set after the data packet arrives in response to the interest packet when the data packet does not contain the feature set. Thus, storing the feature set in the PIT enables intermediate nodes to store computation results into their respective approximate computing content stores as the data packet passes back through the ICN.

Figure 2:
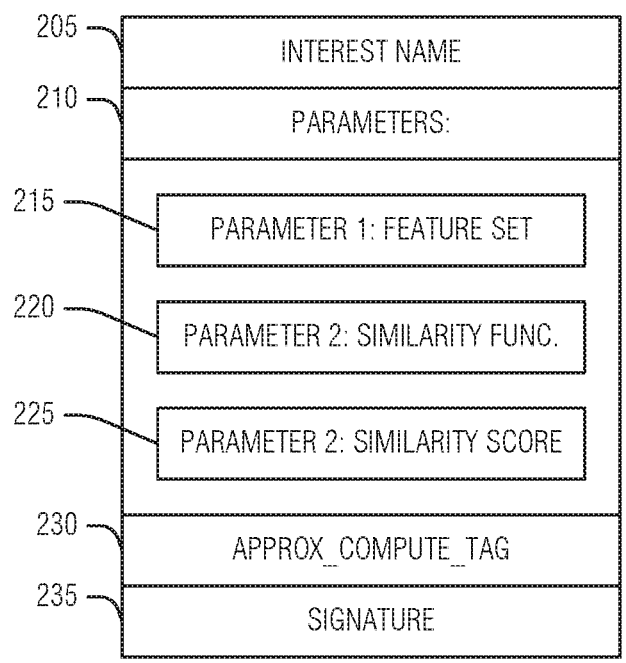
FIG. 2 is an example of an interest packet, according to an embodiment.

FIG. 2 is an example of an interest packet, according to an embodiment. This interest packet format may be referred to as a special interest packet within the context of approximate computation caching. Such an interest packet may be used by consumer interested in detecting an object from its captured images, for example. In this scenario, the consumer sends this interest packet which contains a tag 230 to signal to a recipient that the consumer is content with approximate computation results. In the illustrated example, the interest packet includes three parameters 210—in addition to the name 205 and signature 235—not generally found in standard ICN interest packets: a feature vector set 215 (e.g., generated from the raw input data), inclusion or identification of a similarity function 220 (e.g., Euclidean distance, etc.) that is used to determine similarity between an input feature vector set 215 and cached entries, and a similarity score threshold 225 (e.g., defining what value of the function between the feature set and cached entries is "close enough." In an example, the feature vector set 215 is generated by the consumer. In an example, the feature set 215 is generated by an ICN node if the approximate value flag 230 is set. In an example, each parameter 210 is encoded using a Type-Length-Value (TLV) format. In an example, because a feature set 215 often contains multiple features, the value field of a one parameter TLV may be formatted using JavaScript Object Notation (JSON) format to encode and decode multiple features.

Figure 3A:
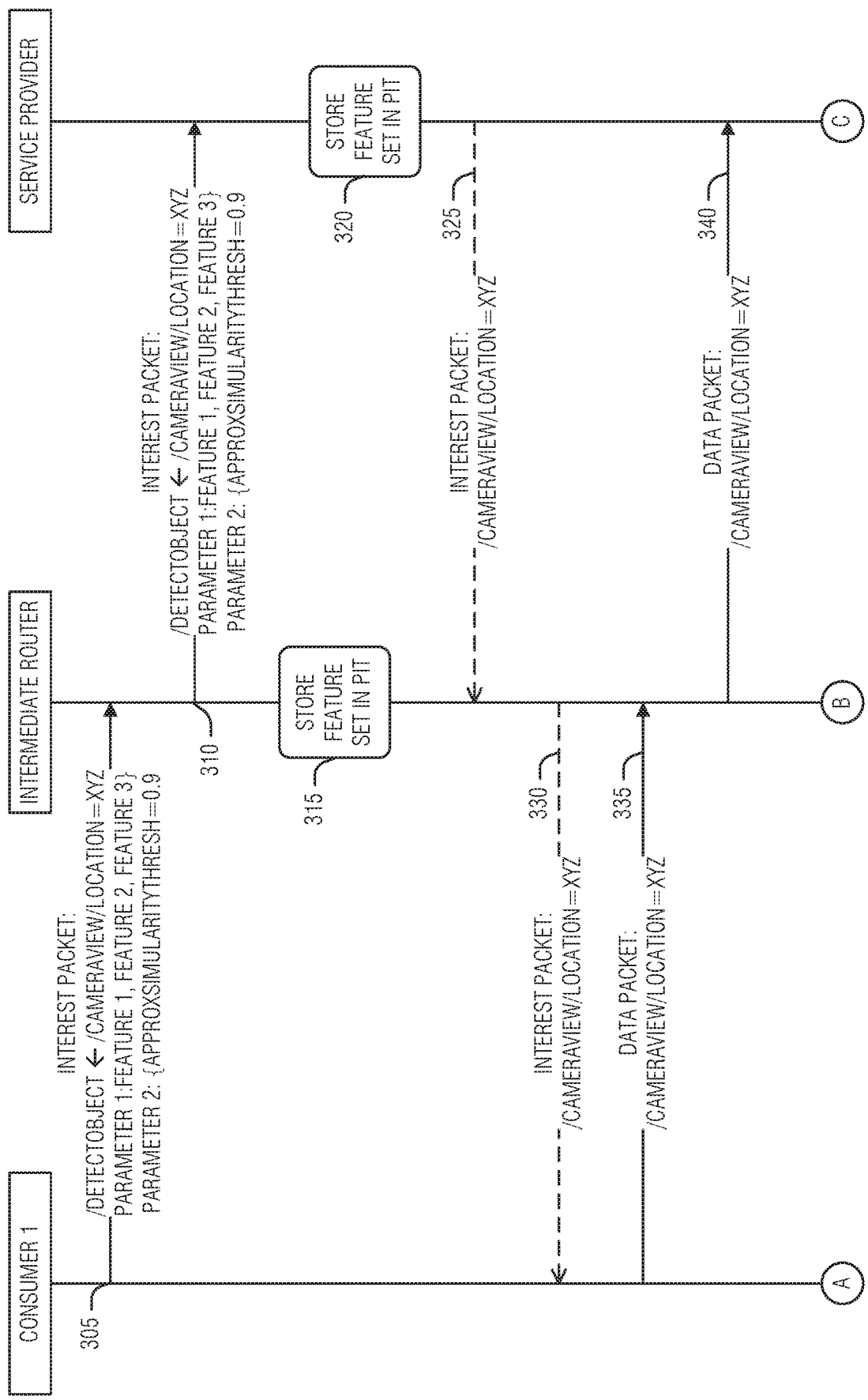

FIGS. 3A-3B illustrates an example of a data flow for ICN approximate computation caching, according to an embodiment. The illustrated flow is between a consumer node, an intermediate node (e.g., router), and a service provider that returns computational data.

As illustrated, the consumer sends an interest packet with the name "/detectObject←/cameraView/location=XYZ" and parameters containing a feature set and a similarity score (e.g., 0.9) (message 305). This interest packet also has an approximate computation tag is set to 1, indicating that approximate results are allowed.

The forwarding logic of the intermediate node checks the approximate computation tag and, because it is 1, the forwarding logic performs a lookup using the approximate computation store. As this is the first interest for these computational results, the intermediate node does not find any entry in its approximate computation content store and thus creates a PIT entry with the parameters (action 315). The modified PIT table entry includes the feature vector set corresponding to the pending interest with approximate computation tag. The intermediate node then forwards the interest packet towards the service provider node that may perform the requested object detection (e.g., /detectObject) service (message 310).

The service provider node also fails to find a cached entry of previous computations (e.g., in computation store) that approximately matches with similarity score within the similarity threshold the feature vector set parameter of interest packet. Hence, the forwarding logic of service provider creates a PIT entry (action 320) with feature set for the original interest packet and creates another interest packet requesting raw input data (message 325).

The new interest packet reaches the consumer (message 330) via the intermediate router. In response, the consumer sends the raw input as a data packet (message 335 & message 340) to the service provider.

The forwarding logic of service provider node passes the raw input data to an application hosted at the service provider node. The application then executes the function to detect objects from the raw data (action 345). The object detection result is wrapped in a data packet and put back on the ICN to respond to the original interest packet (message 350). While forwarding this data packet, the service provider node also creates an entry into its approximate cache content store with a key that is a feature vector set (e.g., that which was originally that was stored in PIT) and a value that is the computation result.

The intermediate node perform a similar operation of creating an entry into its own approximate computation content store (action 360) from the PIT entry, or from the data packet if the feature set is included, while passing the data packet to the consumer (message 355).

Now, a second consumer, who is a neighboring node of the first consumer, sends an interest packet with parameters containing a feature set extracted from its input (e.g., images) and a similarity score threshold of 0.9 (message 365). The intermediate node performs locality sensitive hashing to find a match between the feature set of interest packet and its cached entries (action 370). Here, in an example, several approximate computation cached entries meet the threshold (e.g., have a similarity above 0.9). In this example, the intermediate node selects the entry with the greatest affinity for the interest packet of the second consumer, and returns a data packet with the value from this entry (message 375). The data packet, in this case, contains a special tag "ApproxResult" to inform the second consumer that the result is an approximate computation result.

It is possible that sharing feature vectors as parameters of interest packet may raise privacy concerns. In order to eliminate such concerns, similarity searches may be performed over encrypted data. In such cases, the service provider may form a secure locality sensitive hashing (LSH) index table out of raw input data. This may be cached by intermediate nodes along with encrypted computation results. A consumer interested in approximate computation results may send the same interest packet as illustrated in FIG. 2 with the exception that the feature vector parameter of the interest packet contains a trapdoor for each feature vector. The keys used to generate the trapdoor may be shared among various nodes using standard key distribution techniques. Such techniques may be used to calculate the similarity between trapdoors of feature vectors and the secure LSH index.

As noted above, an ontology tagging may be used for more flexible assessments of proximity in computational resulting matching. Generally, an ontology captures semantic relationships between things. Often a hierarchy of increasingly specific properties distinguishes a subject from other similar things. For example, an ontology might relate a cat to a dog in an ontology that names mammal as a common parent node. The ontology may distinguish cat from dog by including an intermediate node named feline for cat, or canine for dog. An example of such a hierarchy may be:

Thing:
 →Mammal:
  →Canine:
   →Poodle
   →Labrador
  →Feline:
   →HouseCat
   →Wildcat An ICN name encoding of an ontology may be efficiently constructed by numbering the branches in the hierarchy. For example, the first branch in the hierarchy may be named "0," the second branch named "1," and so forth, such as:

Thing:
 →(0)Mammal:
  →(0)Canine:
   →(0)Poodle
   →(1)Labrador
  →(1)Feline:
   →(0)HouseCat
   →(1)Wildcat
   →(2)ExtinctCat The corresponding ICN name string may be "ont:/0/0/1," which refers to Labrador in the given hierarchy. An approximate interest may be expressed using the name "ont:/0/0" which refers to canine from the given example hierarchy. Thus, content related to both "poodle and "Labrador" would match the interest that specified "canine." Thus, it is apparent that an approximate computation content store may include features for a house cat (e.g. "ont:/0/1/0") and a Labrador. An interest in wild cats (e.g. "ont:/0/1/1") may also match a house cat given a cache matching policy or score that ranks HouseCat and WildCat, but not an Extinct-Cat, as being an approximate match.

Figure 4:
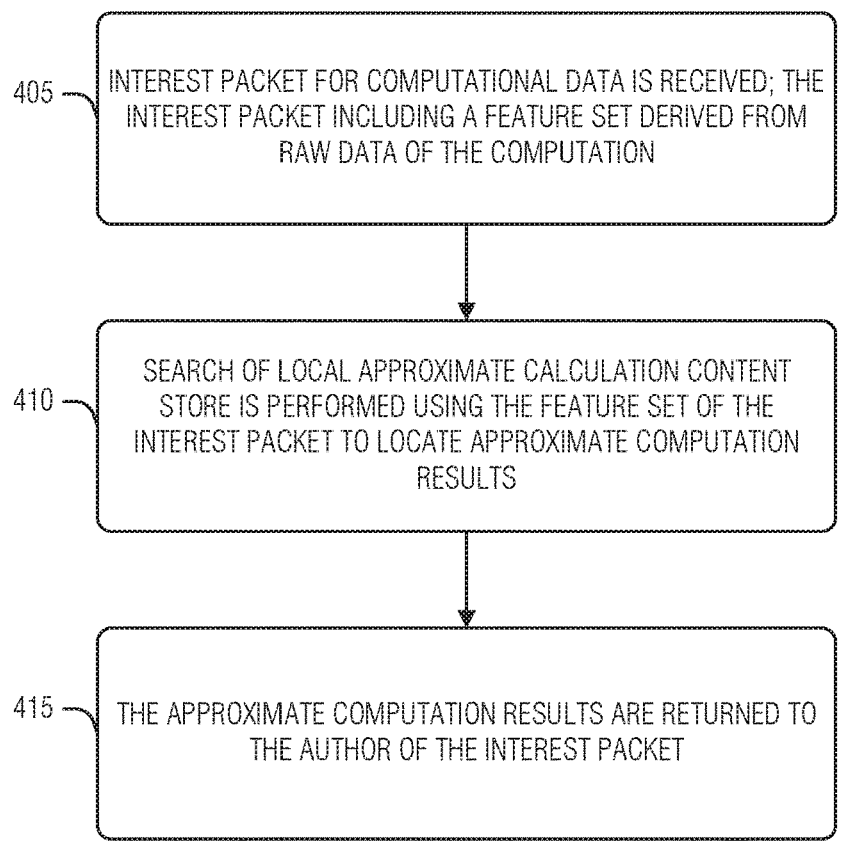
FIG. 4 is an example of a method for ICN approximate calculation caching, according to an embodiment.

FIG. 4 is an example of a method for ICN approximate calculation caching, according to an embodiment. The operations of the method 400 are implemented in computing hardware, such as that described in FIG. 5 or 6 (e.g., processing circuitry).

At operation 405 An interest packet is received. Here, the interest packet includes a feature set of input data. The feature set is a set of values that are extracted from raw data. Some techniques for this process are mentioned above, but essentially, a function distills some aspect of the raw data into one or more values. A simple example may include a list of colors and a percent of the image covered by the colors. Other examples may include words and their frequencies within textual raw data. Generally, the feature set is configured to have values that represent intrinsic properties of the raw data from which similarity comparisons between raw data may be made.

In an example, the interest packet includes a tag separate from the feature set. Here, the tag indicates that approximate computation results will satisfy the interest packet. Although the tag may not be strictly necessary e.g., because the receiving node may inter approximate results are acceptable when the feature set is present inclusion of the tag more explicitly communicates the sending node's intention and may result in computational efficiency (e.g., the parameters need not be sought or parsed when the tag indicates that approximate computations results are not acceptable).

At operation 410, a search of a local data store (e.g., the approximate computation content store of the receiving node) is performed using the feature set. The search determines an approximate computation result cached in the local data store. Here, the approximate computation result was a computational result achieved (e.g., from a service provider) using input data that differs from the input data named in the interest packet.

In an example, the interest packet includes a similarity function used to compare feature sets for the search. Thus, the search involves computing the similarity function on one or more features of the interest packet feature set and the feature set in the approximate computation content score to determine how close the two feature sets are. In an example, the interest packet does not include the similarity function itself, but rather identifies the function. This identification (e.g., a key, hash, index, string, etc.) is used by the receiving node to select the similarity function from a library of similarity functions hosted by a node. In an example, if the receiving node cannot find an implementation of the similarity function locally, the node may retrieve the similarity function from another node.

In an example, the interest packet includes a similarity threshold. The similarity threshold operates in conjunction with the similarity function noted above. The similarity threshold defines how close results of the similarity function upon different feature sets must be to be considered "close enough" by the author of the interest packet.

In an example, the similarity function is hierarchical. In an example, the hierarchy is an ontology. Here, the similarity threshold may indicate within how many levels of the hierarchy the feature set of the interest packet must be to an approximate computation content store entry feature set to be close enough to satisfy the interest packet.

At operation 415, the approximate computation result—found during the search of operation 410—is returned (e.g., in a data packet) to the author of the interest packet. The scenario noted above is the result of the receiving node having computation results that approximately matched those of the interest packet. If, however, there are no such results, the receiving node forwards the interest packet. In this scenario, the receiving node may receive a second interest packet prior to receiving the interest packet. Performing a search (e.g., as in operation 410), and failing to find a response to the second interest packet in the approximate computation content store, the receiving node creates an entry in its PIT that uses a second feature set contained in the second interest packet. The node may then forward the second interest packet on the network.

In an example, in response to receiving a data packet that matches the entry in the PIT, the node may create an entry in the approximate computation content store that includes the second feature set from the PIT and the data in the data packet. In an example, the approximate computation result (e.g., returned in operation 415) is the entry in the approximate computation content store, the feature set and the second feature set being within a similarity threshold.

Figure 5:
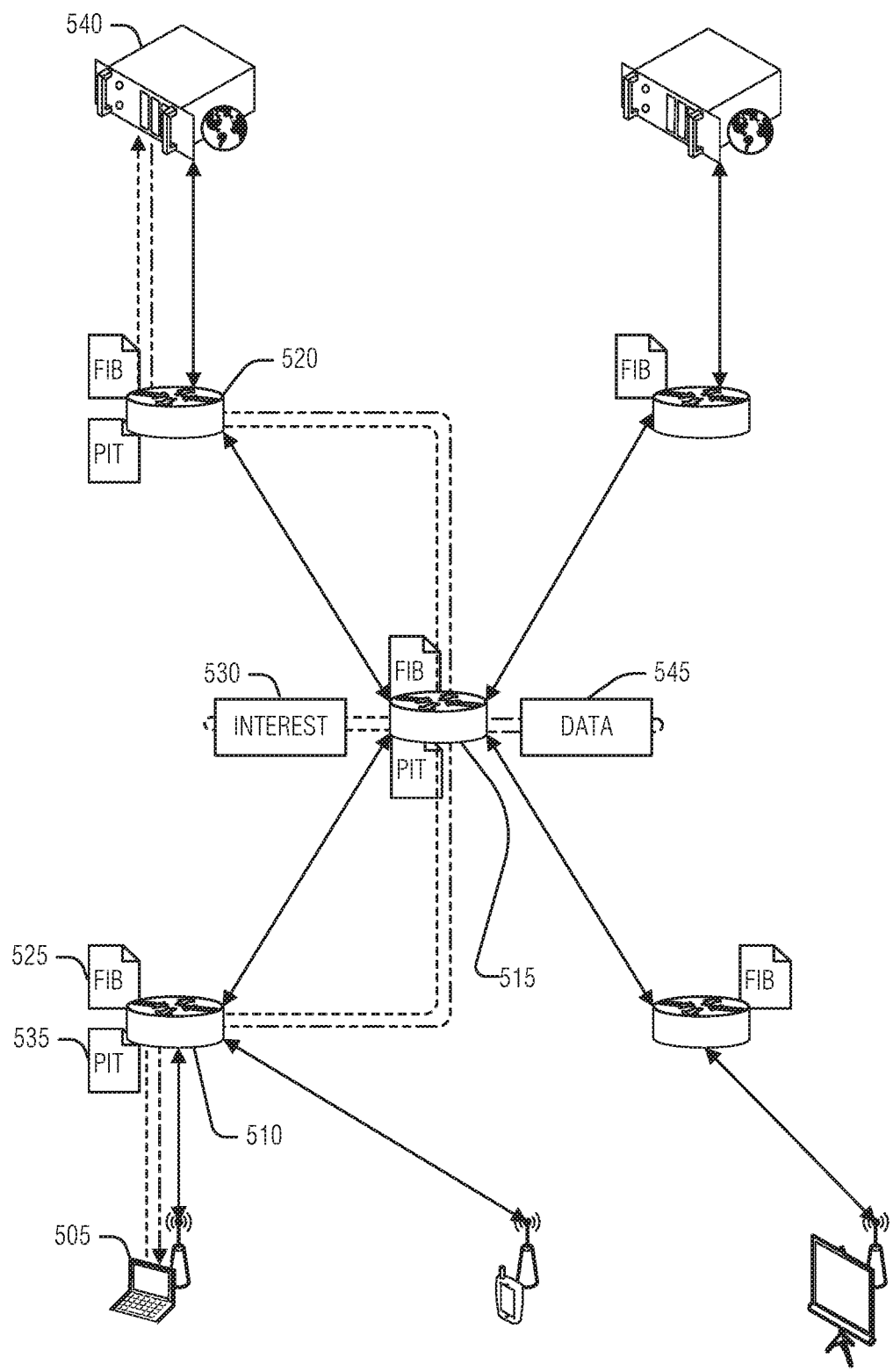
FIG. 5 illustrates an example ICN, according to an embodiment.
Figure 6:
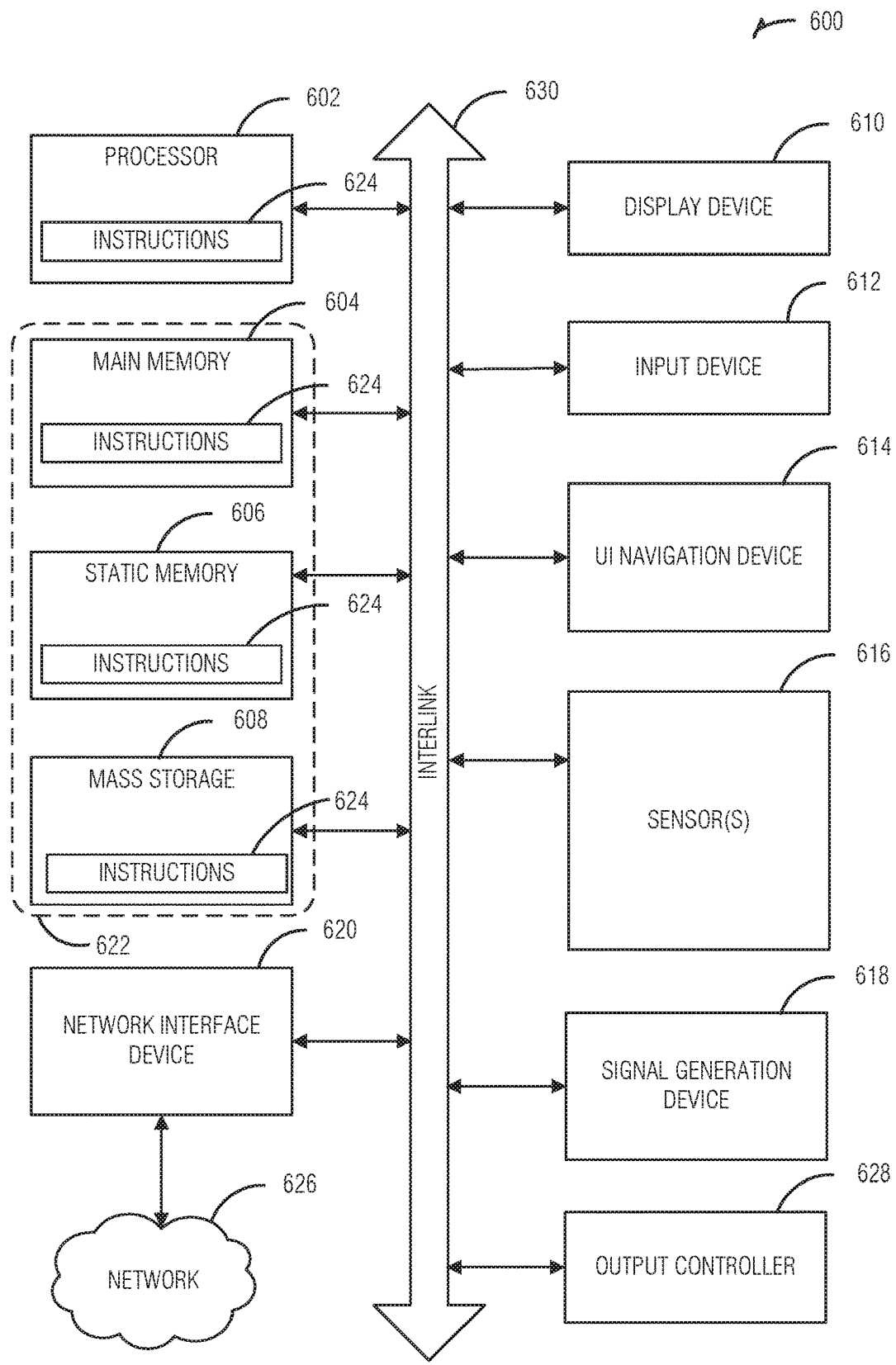
FIG. 6 is a block diagram illustrating an example of a machine upon which one or more embodiments may be implemented.

FIGS. 5 and 6 below provide additional details of the components in FIG. 1. For example, FIG. 5 illustrates several details and variations in ICNs. FIG. 6 illustrates several examples of computer hardware that may be used to implement any of the components illustrated in FIG. 1, FIG. 5 illustrates an example ICN, according to an embodiment ICNs operate differently than traditional host-based (e.g., address-based) communication networks. ICN is an umbrella term for a networking paradigm in which information itself is named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 505 (e.g., subscriber) requests named content from the network itself. The content request may be called an interest and transmitted via an interest packet 530. As the interest packet traverses network devices (e.g., network elements, routers, switches, hubs, etc.)—such as network elements 510, 515, and 520—a record of the interest is kept, for example, in a pending interest table (PIT) at each network element. Thus, network element 510 maintains an entry in its PIT 535 for the interest packet 530, network element 515 maintains the entry in its PIT, and network element 520 maintains the entry in its PIT.

When a device, such as publisher 540, that has content matching the name in the interest packet 530 is encountered, that device 540 may send a data packet 545 in response to the interest packet 530. Typically, the data packet 545 is tracked back through the network to the source (e.g., device 505) by following the traces of the interest packet 530 left in the network element PH's. Thus, the PIT 535 at each network element establishes a trail back to the subscriber 505 for the data packet 545 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com" a sub-category, "videos," and the canonical identification "v8675309." As an interest 530 traverses the ICN, ICN network elements will generally attempt to match the name to a greatest degree. Thus, if an ICN element has a cached item or route for both "www-.somedomain.com or videos" and "www.somedomain.com or videos or v8675309," the ICN element will match the later for an interest packet 530 specifying "www.somedomain.com or videos or v8675309." in an example, an expression may be used in matching by the ICN device. For example, the interest packet may specify "www.somedomain.com or videos or v8675*" where '*' is a wildcard. Thus, any cached item or route that includes the data other than the wildcard will be matched.

Item matching involves matching the interest 530 to data cached in the ICN element. Thus, for example, if the data 545 named in the interest 530 is cached in network element 515, then the network element 515 will return the data 545 to the subscriber 505 via the network element 510. However, if the data 545 is not cached at network element 515, the network element 515 routes the interest 530 on (e.g., to network element 520). To facilitate routing, the network elements may use a forwarding information base 525 (FIB) to match named data to an interface (e.g., physical port) for the route. Thus, the FIB 525 operates much like a routing table on a traditional network device.

In an example, additional meta-data may be attached to the interest packet 530, the cached data, or the route (e.g., in the FIB 525), to provide an additional level of matching. For example, the data name may be specified as "www.somedomain.com or videos or v8675309," but also include a version number—or timestamp, time range, endorsement, etc. in this example, the interest packet 530 may specify the desired name, the version number, or the version range. The matching may then locate routes or cached data matching the name and perform the additional comparison of meta-data or the like to arrive at an ultimate decision as to whether data or a route matches the interest packet 530 for respectively responding to the interest packet 530 with the data packet 545 or forwarding the interest packet 530.

ICN has advantages over host-based networking because the data segments are individually named. This enables aggressive caching throughout the network as a network element may provide a data packet 530 in response to an interest 530 as easily as an original author 540. Accordingly, it is less likely that the same segment of the network will transmit duplicates of the same data requested by different devices.

Fine grained encryption is another feature of many ICN networks. A typical data packet 545 includes a name for the data that matches the name in the interest packet 530. Further, the data packet 545 includes the requested data and may include additional information to filter similarly named data (e.g., by creation time, expiration time, version, etc.). To address malicious entities providing false information under the same name, the data packet 545 may also encrypt its contents with a publisher key or provide a cryptographic hash of the data and the name. Thus, knowing the key (e.g., from a certificate of an expected publisher 540) enables the recipient to ascertain whether the data is from that publisher 540. This technique also facilitates the aggressive caching of the data packets 545 throughout the network because each data packet 545 is self-contained and secure. In contrast, many host-based networks rely on encrypting a connection between two hosts to secure communications. This may increase latencies while connections are being established and prevents data caching by hiding the data from the network elements.

Example ICN networks include: content centric networking (CCN)—as specified in the Internet Engineering Task Force (IETF) draft specifications for CCNx 0.x and CCN 1.x; named data networking (NDN)—as specified in the NDN technical report DND-0001; Data-Oriented Network Architecture (DONA)—as presented at proceedings of the 2007 Association for Computing Machinery's (ACM) Special Interest Group on Data Communications (SIGCOMM) conference on Applications, technologies, architectures, and protocols for computer communications; Named Functions Networking (NFN); 4WARD; Content Aware Searching, Retrieval and Streaming (COAST); Convergence of Fixed and Mobile Broadband Access/Aggregation Networks (COMBO); Content Mediator Architecture for Content-Aware Networks (COMET); CONVERGENCE; GreenICN; Network of Information NetInf); IP Over ICN (POINT); Publish-Subscribe Internet Routing Paradigm (PSIRP); Publish Subscribe Internet Technology (PURSUIT); Scalable and Adaptive Internet Solutions (SAIL); Universal, Mobile-Centric and Opportunistic Communications Architecture (UMOBILE); among others.

FIG. 6 illustrates a block diagram of an example machine 600 upon which any one or more of the techniques (e.g., methodologies) discussed herein may perform. Examples, as described herein, may include, or may operate by, logic or a number of components, or mechanisms in the machine 600. Circuitry (e.g., processing circuitry) is a collection of circuits implemented in tangible entities of the machine 600 that include hardware (e.g., simple circuits, gates, logic, etc. Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 600 follow.

In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 600 may include a hardware processor 602 (e.g., a central processing unit (CPU), a graphics processing unit (GPU), a hardware processor core, or any combination thereof), a main memory 604, a static memory (e.g., memory or storage for firmware, microcode, a basic-input-output (BIOS), unified extensible firmware interface (UEFI), etc.) 606, and mass storage 608 (e.g., hard drive, tape drive, flash storage, or other block devices) some or all of which may communicate with each other via an interlink (e.g., bus) 630. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 608, a signal generation device 618 (e.g., a speaker), a network interface device 620, and one or more sensors 616, such as a global positioning system (GPS) sensor, compass, accelerometer, or other sensor. The machine 600 may include an output controller 628, such as a serial (e.g., universal serial bus (USB), parallel, or other wired or wireless infrared (IR), near field communication (NFC), etc. connection to communicate or control one or more peripheral devices (e.g., a printer, card reader, etc.).

Registers of the processor 602, the main memory 604, the static memory 606, or the mass storage 608 may be, or include, a machine readable medium 622 on which is stored one or more sets of data structures or instructions 624 (e.g., software) embodying or utilized by any one or more of the techniques or functions described herein. The instructions 624 may also reside, completely or at least partially, within any of registers of the processor 602, the main memory 604, the static memory 606, or the mass storage 608 during execution thereof by the machine 600. In an example, one or any combination of the hardware processor 602, the main memory 604, the static memory 606, or the mass storage 608 may constitute the machine readable media 622. While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may be further transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software. A transmission medium is a machine readable medium.

Example 1 is a device for information centric network (ICN) approximate computation caching, the device comprising: processing circuitry; and a memory including instructions that, when the device is in operation, configure the processing circuitry to: receive an interest packet that includes a feature set of input data; perform a search of a local data store using the feature set to determine an approximate computation result cached in the local data store, the approximate computation result based on input data that differs from the input data named in the interest packet; and return the approximate computation result to an author of the interest packet in response to the search.

In Example 2, the subject matter of Example 1, wherein the interest packet includes a tag separate from the feature set, the tag indicating that approximate computation results will satisfy the interest packet.

In Example 3, the subject matter of any of Examples 1-2, wherein the interest packet includes a similarity function used to compare feature sets for the search.

In Example 4, the subject matter of Example 3, wherein, to include the similarity function, the interest packet includes identification of the similarity function that is used to select the similarity function from a library of similarity functions hosted by a node.

In Example 5, the subject matter of any of Examples 3-4, wherein the interest packet includes a similarity threshold, used by the search to select results that have similarity function results within the similarity threshold.

In Example 6, the subject matter of any of Examples 3-5, wherein the similarity function is hierarchical.

In Example 7, the subject matter of Example 6, wherein the hierarchy is an ontology.

In Example 8, the subject matter of any of Examples 1-7, wherein the instructions further configure the processing circuitry to: receive a second interest packet prior to receiving the interest packet; create an entry in a PIT that uses a second feature set contained in the second interest packet after failing to find a response to the second interest packet in the approximate computation content store; and forward the second interest packet on the network.

In Example 9, the subject matter of Example 8, wherein the instructions further configure the processing circuitry to: receive a data packet that matches the entry in the PIT; and create an entry in the approximate computation content store that includes the second feature set from the PIT and the data in the data packet.

In Example 10, the subject matter of Example 9, wherein the approximate computation result is the entry in the approximate computation content store, the feature set and the second feature set being within a similarity threshold.

Example 11 is a method for information centric network (ICN) approximate computation caching, the method comprising: receiving an interest packet that includes a feature set of input data; performing a search of a local data store using the feature set to determine an approximate computation result cached in the local data store, the approximate computation result based on input data that differs from the input data named in the interest packet; and returning the approximate computation result to an author of the interest packet in response to the search.

In Example 12, the subject matter of Example 11, wherein the interest packet includes a tag separate from the feature set, the tag indicating that approximate computation results will satisfy the interest packet.

In Example 13, the subject matter of any of Examples 11-12, wherein the interest packet includes a similarity function used to compare feature sets for the search.

In Example 14, the subject matter of Example 13, wherein, to include the similarity function, the interest packet includes identification of the similarity function that is used to select the similarity function from a library of similarity functions hosted by a node.

In Example 15, the subject matter of any of Examples 13-14, wherein the interest packet includes a similarity threshold, used by the search to select results that have similarity function results within the similarity threshold.

In Example 16, the subject matter of any of Examples 13-15, wherein the similarity function is hierarchical.

In Example 17, the subject matter of Example 16, wherein the hierarchy is an ontology.

In Example 18, the subject matter of any of Examples 11-17, comprising: receiving a second interest packet prior to receiving the interest packet; creating an entry in a PIT that uses a second feature set contained in the second interest packet after failing to find a response to the second interest packet in the approximate computation content store; and forwarding the second interest packet on the network.

In Example 19, the subject matter of Example 18, comprising: receiving a data packet that matches the entry in the PIT; and creating an entry in the approximate computation content store that includes the second feature set from the PIT and the data in the data packet.

In Example 20, the subject matter of Example 19, wherein the approximate computation result is the entry in the approximate computation content store, the feature set and the second feature set being within a similarity threshold.

Example 21 is at least one machine-readable medium including instructions for information centric network (ICN) approximate computation caching, the instructions, when executed by processing circuitry, cause the processing circuitry to perform operations comprising: receiving an interest packet that includes a feature set of input data; performing a search of a local data store using the feature set to determine an approximate computation result cached in the local data store, the approximate computation result based on input data that differs from the input data named in the interest packet; and returning the approximate computation result to an author of the interest packet in response to the search.

In Example 22, the subject matter of Example 21, wherein the interest packet includes a tag separate from the feature set, the tag indicating that approximate computation results will satisfy the interest packet.

In Example 23, the subject matter of any of Examples 21-22, wherein the interest packet includes a similarity function used to compare feature sets for the search.

In Example 24, the subject matter of Example 23, wherein, to include the similarity function, the interest packet includes identification of the similarity function that is used to select the similarity function from a library of similarity functions hosted by a node.

In Example 25, the subject matter of any of Examples 23-24, wherein the interest packet includes a similarity threshold, used by the search to select results that have similarity function results within the similarity threshold.

In Example 26, the subject matter of any of Examples 23-25, wherein the similarity function is hierarchical.

In Example 27, the subject matter of Example 26, wherein the hierarchy is an ontology.

In Example 28, the subject matter of any of Examples 21-27, wherein the operations comprise: receiving a second interest packet prior to receiving the interest packet; creating an entry in a PIT that uses a second feature set contained in the second interest packet after failing to find a response to the second interest packet in the approximate computation content store; and forwarding the second interest packet on the network.

In Example 29, the subject matter of Example 28, wherein the operations comprise: receiving a data packet that matches the entry in the PIT; and creating an entry in the approximate computation content store that includes the second feature set from the PIT and the data in the data packet.

In Example 30, the subject matter of Example 29, wherein the approximate computation result is the entry in the approximate computation content store, the feature set and the second feature set being within a similarity threshold.

Example 31 is a system for information centric network (ICN) approximate computation caching, the system comprising: means for receiving an interest packet that includes a feature set of input data; means for performing a search of a local data store using the feature set to determine an approximate computation result cached in the local data store, the approximate computation result based on input data that differs from the input data named in the interest packet; and means for returning the approximate computation result to an author of the interest packet in response to the search.

In Example 32, the subject matter of Example 31, wherein the interest packet includes a tag separate from the feature set, the tag indicating that approximate computation results will satisfy the interest packet.

In Example 33, the subject matter of any of Examples 31-32, wherein the interest packet includes a similarity function used to compare feature sets for the search.

In Example 34, the subject matter of Example 33, wherein, to include the similarity function, the interest packet includes identification of the similarity function that is used to select the similarity function from a library of similarity functions hosted by a node.

In Example 35, the subject matter of any of Examples 33-34, wherein the interest packet includes a similarity threshold, used by the search to select results that have similarity function results within the similarity threshold.

In Example 36, the subject matter of any of Examples 33-35, wherein the similarity function is hierarchical.

In Example 37, the subject matter of Example 36, wherein the hierarchy is an ontology.

In Example 38, the subject matter of any of Examples 31-37, comprising: means for receiving a second interest packet prior to receiving the interest packet; means for creating an entry in a PIT that uses a second feature set contained in the second interest packet after failing to find a response to the second interest packet in the approximate computation content store; and means for forwarding the second interest packet on the network.

In Example 39, the subject matter of Example 38, comprising: means for receiving a data packet that matches the entry in the PIT; and means for creating an entry in the approximate computation content store that includes the second feature set from the PIT and the data in the data packet.

In Example 40, the subject matter of Example 39, wherein the approximate computation result is the entry in the approximate computation content store, the feature set and the second feature set being within a similarity threshold.

Example 41 is at least one machine-readable medium including instructions that, when executed by processing circuitry, cause the processing circuitry to perform operations to implement of any of Examples 1-40.

Example 42 is an apparatus comprising means to implement of any of Examples 1-40.

Example 43 is a system to implement of any of Examples 1-40.

Example 44 is a method to implement of any of Examples 1-40.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device for information centric network (ICN) approximate computation caching, the device comprising:
    processing circuitry; and
    a memory including instructions that, when the device is in operation, configure the processing circuitry to:
        receive an interest packet that includes:
            a feature set of first input data to a computation;
            a similarity function; and
            a similarity threshold;
        perform a search of a local data store using the feature set to determine an approximate computation result cached in the local data store, the approximate computation result based on second input data, to the computation, that differs from the first input data named in the interest packet, the search using the similarity function to compare the first input data in the feature set to the second input data for the approximate computation result and select the approximate computation result based on being within the similarity threshold; and
        return the approximate computation result to an author of the interest packet in response to the search.

2. The device of claim 1, wherein the interest packet includes a tag separate from the feature set, the tag indicating that approximate computation results will satisfy the interest packet.

3. The device of claim 1, wherein, to include the similarity function, the interest packet includes identification of the similarity function that is used to select the similarity function from a library of similarity functions hosted by a node.

4. The device of claim 1, wherein the instructions further configure the processing circuitry to:
    receive a second interest packet prior to receiving the interest packet;
    create an entry in a PIT that uses a second feature set contained in the second interest packet after failing to find a response to the second interest packet in the approximate computation content store; and
    forward the second interest packet on the network.

5. The device of claim 4, wherein the instructions further configure the processing circuitry to:
    receive a data packet that matches the entry in the PIT; and
    create an entry in the approximate computation content store that includes the second feature set from the PIT and the data in the data packet.

6. The device of claim 5, wherein the approximate computation result is the entry in the approximate computation content store, the feature set and the second feature set being within a similarity threshold.

7. The device of claim 1, wherein the similarity function is hierarchical.

8. The device of claim 7, wherein the hierarchy is an ontology.

9. A method for information centric network (ICN) approximate computation caching, the method comprising:
    receiving an interest packet that includes:
        a feature set of first input data to a computation;
        a similarity function; and
        a similarity threshold;
    performing a search of a local data store using the feature set to determine an approximate computation result cached in the local data store, the approximate computation result based on second input data, to the computation, that differs from the first input data named in the interest packet, the search using the similarity function to compare the first input data in the feature set to the second input data for the approximate computation result and select the approximate computation result based on being within the similarity threshold; and returning the approximate computation result to an author of the interest packet in response to the search.

10. The method of claim 9, wherein the interest packet includes a tag separate from the feature set, the tag indicating that approximate computation results will satisfy the interest packet.

11. The method of claim 9, wherein, to include the similarity function, the interest packet includes identification of the similarity function that is used to select the similarity function from a library of similarity functions hosted by a node.

12. The method of claim 9, comprising:
receiving a second interest packet prior to receiving the interest packet;
creating an entry in a PIT that uses a second feature set contained in the second interest packet after failing to find a response to the second interest packet in the approximate computation content store; and
forwarding the second interest packet on the network.

13. The method of claim 12, comprising:
receiving a data packet that matches the entry in the PIT; and
creating an entry in the approximate computation content store that includes the second feature set from the PIT and the data in the data packet.

14. The method of claim 13, wherein the approximate computation result is the entry in the approximate computation content store, the feature set and the second feature set being within a similarity threshold.

15. The method of claim 9, wherein the similarity function is hierarchical.

16. The method of claim 15, wherein the hierarchy is an ontology.

17. At least one non-transitory machine-readable medium including instructions for information centric network (ICN) approximate computation caching, the instructions, when executed by processing circuitry, cause the processing circuitry to perform operations comprising:
receiving an interest packet that includes:
a feature set of first input data to a computation;
a similarity function; and
a similarity threshold;
performing a search of a local data store using the feature set to determine an approximate computation result cached in the local data store, the approximate computation result based on second input data, to the computation, that differs from the first input data named in the interest packet, the search using the similarity function to compare the first input data in the feature set to the second input data for the approximate computation result and select the approximate computation result based on being within the similarity threshold; and returning the approximate computation result to an author of the interest packet in response to the search.

18. The at least one non-transitory machine-readable medium of claim 17, wherein the interest packet includes a tag separate from the feature set, the tag indicating that approximate computation results will satisfy the interest packet.

19. The at least one non-transitory machine-readable medium of claim 17, wherein, to include the similarity function, the interest packet includes identification of the similarity function that is used to select the similarity function from a library of similarity functions hosted by a node.

20. The at least one non-transitory machine-readable medium of claim 17, wherein the operations comprise:
receiving a second interest packet prior to receiving the interest packet;
creating an entry in a PIT that uses a second feature set contained in the second interest packet after failing to find a response to the second interest packet in the approximate computation content store; and
forwarding the second interest packet on the network.

21. The at least one non-transitory machine-readable medium of claim 20, wherein the operations comprise:
receiving a data packet that matches the entry in the PIT; and
creating an entry in the approximate computation content store that includes the second feature set from the PIT and the data in the data packet.

22. The at least one non-transitory machine-readable medium of claim 21, wherein the approximate computation result is the entry in the approximate computation content store, the feature set and the second feature set being within a similarity threshold.

23. The at least one non-transitory machine-readable medium of claim 17, wherein the similarity function is hierarchical.

24. The at least one non-transitory machine-readable medium of claim 23, wherein the hierarchy is an ontology.

* * * * *